Nov. 19, 1929.  G. F. ROYER  1,736,055
APPARATUS FOR TREATING AND BLENDING MOLDERS' SAND
Filed July 12, 1927   3 Sheets-Sheet 2
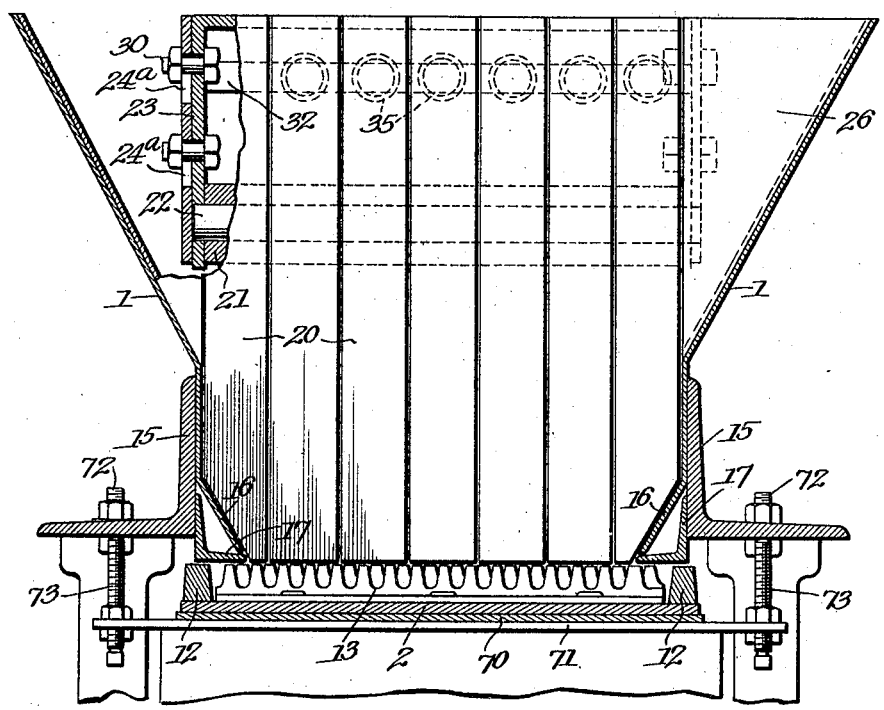
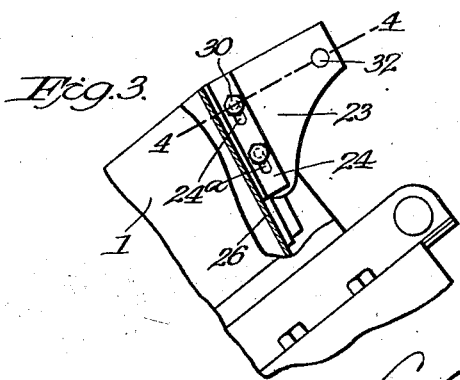
Inventor
George F. Royer

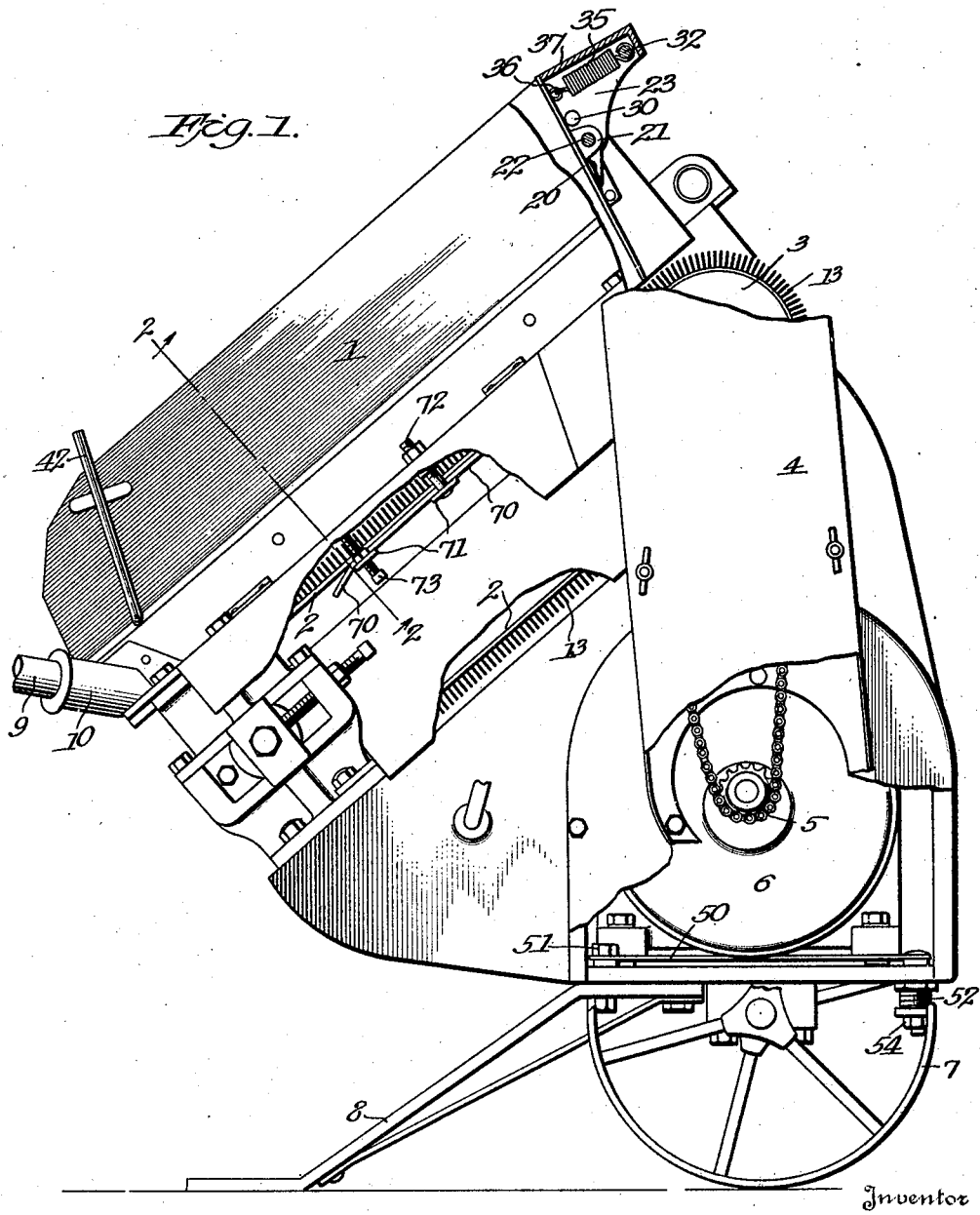

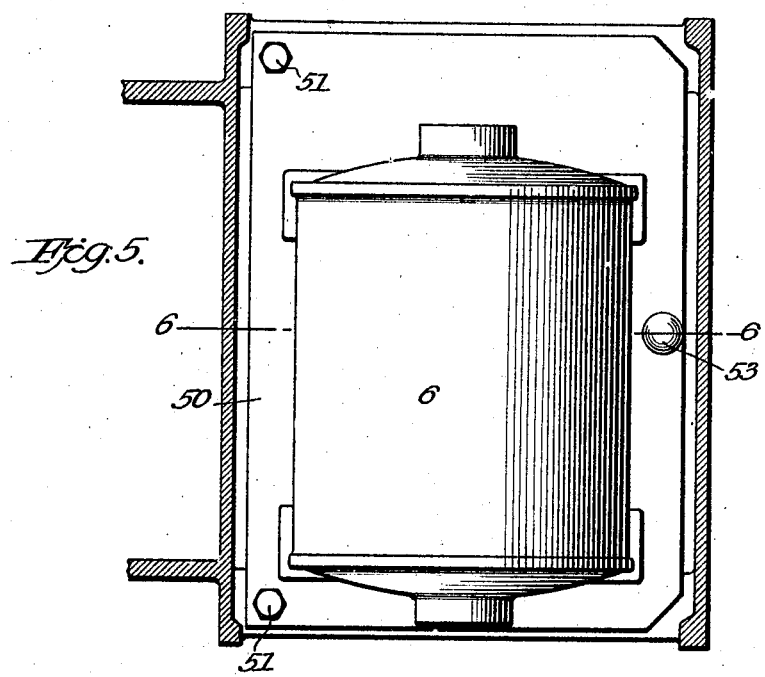
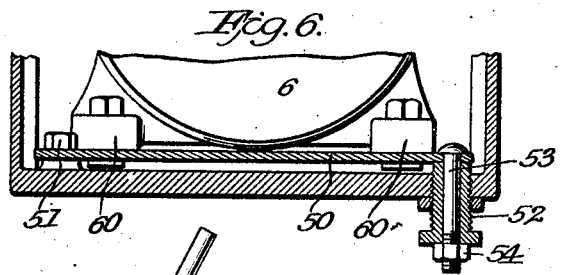
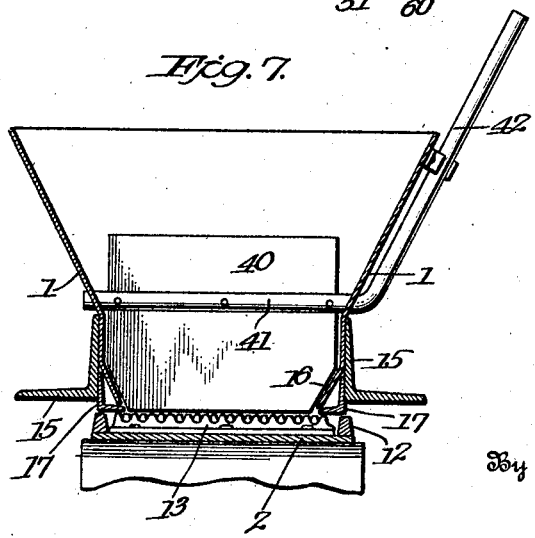

Patented Nov. 19, 1929

1,736,055

UNITED STATES PATENT OFFICE

GEORGE F. ROYER, OF WILKES-BARRE, PENNSYLVANIA, ASSIGNOR TO ROYER FOUNDRY AND MACHINE CO., OF WILKES-BARRE, PENNSYLVANIA, A CORPORATION OF PENNSYLVANIA

APPARATUS FOR TREATING AND BLENDING MOLDERS' SAND

Application filed July 12, 1927. Serial No. 205,177.

The present invention relates to improvements in apparatus of the character of that described and claimed in an earlier Patent No. 1,559,915, dated November 3, 1925.

The object of the present invention is to provide a machine of the character referred to which will specifically have certain advantages over the machine of said patent and which will be hereinafter more particularly described.

In the accompanying drawings:

Figure 1 is a side elevation, partly broken away, of an embodiment of the present invention.

Figure 2 is a transverse vertical section through the hopper, substantially on the line 2—2 of Figure 1.

Figure 3 is a detail.

Figure 4 is a section substantially on the line 4—4 of Figure 3.

Figure 5 is a horizontal section through the motor casing.

Figure 6 is a section substantially on the line 6—6 of Figure 5, and

Figure 7 is a transverse vertical section through the hopper adjacent the lower end thereof.

In the several figures of the drawing, like parts are designated by the same reference characters and it will be understood that some of the parts are shown more or less diagrammatically and that there can be variation in the details illustrated without departing from the invention.

Except where specifically referred to in the appended claims, the invention is not to be understood as being limited to the exact details shown.

Referring particularly to Figure 1, it will be seen that the improved machine, like that of the patent referred to, includes a suitable hopper, having side walls 1, which is open at the bottom and positioned above a flexible separating belt 2 mounted upon suitable supporting rollers to travel in a vertically inclined direction, the upper supporting roll 3 being connected by suitable gearing enclosed in a casing 4 with a sprocket 5 on the shaft of an electric motor 6.

The belt supporting rollers and the motor are mounted in a supporting frame which is in the form of a readily portable truck having ground wheels 7 and a trail extension 8. By means of suitable handles 9, inserted in sockets 10, one at each side of the machine, the entire apparatus may be readily moved over a foundry floor or other surface on which the wheels 7 rest.

The belt 2, which is driven at a relatively high speed by the motor 6, is, as is customary in this type of machine, provided with a series of outwardly projecting sprigs which will separate granular like particles from a mass of material deposited upon the belt within the walls of the hopper and the separated particles collected in the spaces between the sprigs on the belt will be discharged in a stream as they pass over the upper belt supporting pulley 3.

The speed at which the belt is driven is such that the stream of particles thus separated and collected will be discharged at a considerable distance from the apparatus, the passage of the same through the air serving to thoroughly areate them and assist in conditioning the material for use in the preparation of metal molds.

The separating belt of the present improvements is preferably made of suitable woven fabric and is provided adjacent its edges with outwardly projecting ribs 12. The sprigs 13 referred to are preferably formed by serrating the outwardly projecting flanges of angle-shaped members, the bases of which are suitably secured to the body of the belt. As shown, each of the sprig plates extends substantially across the space between the marginal flanges or ribs 12 on the belt and said ribs or flanges extend across the spaces between the successive rows of sprigs and act to prevent particles collected in such spaces from flowing over the side edges of the belt. The plates may, of course, be of various lengths and a plurality of aligned plates may be employed for providing each transverse row of sprigs.

As shown, particularly in Figure 2, the supporting frame includes two main members 15 of angle iron and the side walls 1 of the hopper are suitably connected to said angle iron bars, the upper portions of such walls being flared outwardly, as shown. The lower portions of the side walls of the hopper are deflected or inclined inwardly as at 16, terminating some distance within the channel formed by the marginal flanges or ribs 12 on the separating belt. These inwardly inclined portions of the side walls of the hopper are strengthened by angles 17 and the material delivered into the hopper is, therefore, deposited toward the center of the belt rather than adjacent the side edges thereof, thus reducing the wear on the fabric and the particles collected between the sprigs are effectively prevented from passing over the edges of the belt by the marginal ribs or flanges 12, which, as shown, extend outwardly to the plane of the outer edges of the separating sprigs.

One of the features of improvement of the present invention over the construction of the prior patent referred to, is the manner in which the detents or sweeps forming a portion of the upper end wall of the hopper, are constructed and mounted. These detents or sweeps consist of suitable metal blades which are supported in a position substantially perpendicular to the path of travel of the belt, and have their lower ends in close proximity to the outer edges of the separating sprigs. They act to normally prevent passage of undesirable material, such as nails, scrap metal, nuts and so forth, which are frequently mixed with used molder's sand, or other undesirably large pieces that are not collected in the spaces separating the sprigs, over the upper belt supporting roll 3 and being discharged with the finer particles that have been collected by the belt.

In the embodiment of the invention illustrated each of these detent or sweep members 20 is provided on its outer face with an apertured ear or lug 21, said ears being mounted on a transverse rod 22 which is supported at its ends in the side walls 23 of a frame which is adjustably connected with the side hopper walls 1. As shown, the side members 23 of this frame are connected to one member of an angle iron 24, the other member of which is riveted or otherwise permanently secured at 25 to portions 26 of the upper end wall of the hopper that project laterally beyond the edges of the belt 2.

The bolts 30 which connect the detent or sweep supporting frame with the angle frame members 24 extend through suitable slots 24ᵃ so that the detents or sweep members may be bodily adjusted relative to the belt to maintain the desired minimum clearance or space between their lower ends and the separating sprigs on the belt. A transverse rod 32 connects the side members 23 of the detent supporting frame and with this rod are engaged the outer ends of a series of coil springs 35, the other end of each of said springs being attached as at 36 to one of the detent or sweep plates 20 at points above the axial support thereof. The springs 35 act to maintain the upper ends of the detents or sweeps 20 in contact with an abutment 37 shown as the top of the frame of which the members 23 are the sides.

It will be seen that with this arrangement anyone of the detents or sweeps is adapted to be rocked about the axis of the supporting rod 22 in case an undesirably large piece of material becomes sufficiently attached to the belt to prevent its being readily dislodged as it comes in contact with the lower forward face of the sprig or detent. After the detent has been rocked rearward to permit the passage of such an obstruction, it will be restored to normal position, as shown in Figure 1, by the action of the spring 35.

The form and manner of mounting the detents or sweeps 20, hereinbefore described, avoids an objection that has been noted in the construction of my prior patent referred to With the arrangement of flexible, or yielding material, blades described in the patent it has been found, in some instances, that after extensive use of a machine said blades will become permanently deflected from their normal position and, therefore, be less efficient than when first installed. It will be appreciated that the mass of material in the hopper is constantly exerting a pressure tending to move the lower ends of the blades toward, or over, the upper belt supporting roll and that occasionally each blade will be moved from its operative position to allow of the passage of a particle larger than can be completely received in the pockets between the sprigs. After a considerable period of use this repeated flexing of the blades results in their acquiring a permanent bend or "set" and that they will not return to the desired normal position shown in the drawing; and therefore the selectiveness of the machine or its ability to limit the size of particles separated from the mass is reduced.

By the arrangement herein described the sweeps or blades are of rigid material and the yielding action of each is due to the independent springs. This arrangement, while permitting each blade to adjust itself to allow the passage below it of undesirably large pieces that are firmly attached to the belt, insures that the body of the blades will not be so deformed or shaped that, after the passage of such a piece, they will not return to their normal, proper, position illustrated.

In the improved machine, the outlet at the lower end of the hopper is normally closed by a gate 40 supported on a rock shaft 41 mounted in bearings in the walls 1 of the hopper and provided at one end with a handle 42 that extends above the upper edge of the hopper side wall so that it may be readily grasped by an attendant. By rocking the shaft 41 the gate 40 may be turned so that pieces which have been separated from the desired granular particles may be discharged from the lower end of the belt instead of having to be manually removed therefrom as in the machine of the earlier patent where the lower end 2 of the hopper was of a stationary nature.

According to the present invention, the motor 6 is mounted within a suitable metal casing and preferably upon a base plate 50 of a flexible nature. This motor supporting base is rigidly secured at one edge as by bolts 51 to the truck frame or body and adjacent its other edge is engaged with a threaded sleeve 52 which engages a threaded aperture in the truck body or supporting frame. The sleeve 52 is shown as mounted loosely upon a stud 53 riveted at one end to the flexible motor supporting plate 50 and provided at its other end with a nut 54 so that said sleeve may be readily rotated to raise or lower the edge of the motor supporting plate connected with the stud 53. By rotating the sleeve 52, the motor 6 may be bodily adjusted vertically, slightly, sufficient to maintain the sprocket chain constituting a portion of the gearing between the motor and upper belt supporting roller 3, properly taut. The motor is shown having corner lugs or ears 60 which are bolted to the plate 50.

To prevent sagging of the upper run of the separator belt between the supporting rolls, a plate 70 is provided. This plate is suitably supported from the angle iron frame bars 15. As shown, bars or straps 71 are secured to and extend transversely across the lower face of the plate. The ends of one of the bars, projecting beyond the edges of the plate and belt, are engaged by threaded rods 72 which extend through the angle frame bars 15 and thus suspend the plate 70 from said frame. The other bars 71 of the plate are engaged with adjusting screws 73, the upper ends of which bear against the lower faces of the frame angle bars 15. By adjusting the screws 73 and threaded supporting rods 72, the plate is maintained in proper position to support the upper run of the separator belt and prevent sagging thereof. The manner in which the improved machine operates may be briefly described as follows:

The material to be treated, preferably used molder's sand or a mixture thereof and fresh sand, is deposited on the separator belt within the walls of the hopper, the belt being rotated at a relatively high speed. The separating sprigs on the belt act to detach small granular particles and collect the same while undesirably large pieces of foreign bodies such as nails, nuts and pieces of metal, which are commonly mixed with the used sand, are prevented from passing from the hopper by the sweeps or detents 20. The small particles collected in the spaces between the sprigs on the belt are discharged in a stream from the upper supporting roller 3 and the larger pieces and material which cannot pass between the sprigs and detents 20 gravitate downwardly and may be discharged from the belt by properly swinging the lower hopper gate 40.

The machine is readily portable and occupies but a minimum amount of space.

While the apparatus hereinbefore described is particularly adapted for use in preparing molder's sand it may be employed for other purposes and for treating different materials. For example such apparatus has been found to be very efficient in preparing top soil or dressings for lawns, golf greens and so forth.

I claim:

1. In an apparatus for the purpose described the combination of a supporting frame, a flexible belt mounted on the frame to travel in an upwardly inclined direction and provided on its outer face with means for separating granular particles from a mass of material deposited on the belt and collecting the separated particles, and a hopper open at the bottom positioned above the belt and having in its upper end wall a plurality of blade-like members extending substantially perpendicular to the path of travel of the belt and having their lower ends closely adjacent the separating elements on the belt, and adapted to move in the direction of travel of the belt under excessive pressure, the side walls of the hopper adjacent the lower edges thereof being deflected inward over the belt and the latter having marginal projections preventing particles collected thereby from passing over the edges of the belt.

2. In an apparatus for the purpose described, the combination of a supporting frame, a flexible belt mounted in said frame to travel in an upwardly inclined direction and provided on its outer face with means for separating granular particles from a body of material deposited on the belt and collecting the separated particles, a hopper for laterally confining the material upon the belt and having in its upper end wall a plurality of blades, the lower ends of which are normally positioned closely adjacent the separating means on the belt and adapted to yield in the direction of travel of the belt, for the purpose described, said blades being bodily adjustable in the direction of their length to vary the distance normally separating their lower ends from the belt.

3. In an apparatus for the purpose described, the combination of a supporting frame, a flexible belt mounted in said frame to travel in an upwardly inclined direction and provided on its outer face with means for separating granular particles from a body of material deposited on the belt and collecting the separated particles, a hopper for laterally confining the material upon the belt and having in its upper end wall a plurality of blades, independently supported to rock about an axis extending transversely of the belt and having their lower ends normally positioned closely adjacent the separating means on the belt, said blades being bodily adjustable in the direction of their length to vary the distance normally separating the lower ends thereof from the belt, and means for yieldingly retaining the blades in a predetermined angular relation to the belt.

4. In an apparatus for the purpose described, the combination of a supporting frame, a flexible belt mounted in said frame to travel in an upwardly inclined direction and provided on its outer face with means for separating granular particles from a body of material supported on the belt and collecting the separated particles, a hopper for laterally confining the material upon the belt, a rod extending across the upper end of the hopper, bearings for said rod secured to the side walls of the hopper and adapted to be bodily adjusted vertically, a series of blades mounted to rock on said rod and collectively forming a part of the upper end wall of the hopper, the lower ends of said blades being normally closely adjacent the separating means on the belt, and yielding means normally maintaining said blades in a predetermined angular relation to the belt.

In testimony whereof I have hereunto set my hand.

GEORGE F. ROYER.